(12) United States Patent
Demsey

(10) Patent No.: US 11,637,907 B2
(45) Date of Patent: Apr. 25, 2023

(54) SYSTEMS AND METHODS FOR TRACKING DEVICE IDS FOR VIRTUALIZED APPLICATIONS

(71) Applicant: Verizon Patent and Licensing INc., Basking Ridge, NJ (US)

(72) Inventor: Seth Mitchell Demsey, Dulles, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 772 days.

(21) Appl. No.: 15/810,486

(22) Filed: Nov. 13, 2017

(65) Prior Publication Data
US 2018/0139297 A1 May 17, 2018

Related U.S. Application Data

(60) Provisional application No. 62/422,960, filed on Nov. 16, 2016.

(51) Int. Cl.
*H04L 67/50* (2022.01)
*H04L 9/40* (2022.01)
(Continued)

(52) U.S. Cl.
CPC .......... *H04L 67/535* (2022.05); *G06F 9/54* (2013.01); *H04L 63/0281* (2013.01);
(Continued)

(58) Field of Classification Search
CPC ..... H04L 67/22; H04L 67/28; H04L 65/1063; H04L 63/0464; H04L 63/123; H04L 63/0428; H04L 63/0281; G06F 9/54
See application file for complete search history.

(56) References Cited

U.S. PATENT DOCUMENTS 5,983,350 A * 11/1999 Minear ............... H04L 63/0227
709/225
6,629,149 B1 * 9/2003 Fraser ............... H04L 29/12066
709/220
(Continued)

FOREIGN PATENT DOCUMENTS

WO  WO-2011088644 A1 * 7/2011 ............ H04W 24/06
WO  WO-2016054699 A1 * 4/2016 ......... G06F 9/45558

OTHER PUBLICATIONS

Richerzhagen et al, Simonstrator: Simulation and Prototyping Platform for Distributed Mobile Applications, In Proc. EAI International Conference on Simulation Tools and Techniques (Simutools), ACM, 2015. (Year: 2015).*

*Primary Examiner* — David R Lazaro
*Assistant Examiner* — Robert A Shaw

(57) ABSTRACT

A method of tracking device IDs for virtualized applications includes receiving, at a proxy server, a network message originating from an emulated application, inspecting the network message to determine if a device ID is set for the network message, obtaining an originating device ID corresponding to the device ID in the network message, replacing the device ID in the network message with the originating device ID, and transmitting the network message to a specified destination server. Alternatively, the method may include intercepting the network message at a network message inspector. Alternatively, the method may include specifying the originating device ID by way of an application programming interface (API).

17 Claims, 7 Drawing Sheets

(51) Int. Cl.
*G06F 9/54* (2006.01)
*H04L 65/1063* (2022.01)
*H04L 67/56* (2022.01)

(52) U.S. Cl.
CPC ........ *H04L 63/0464* (2013.01); *H04L 63/123* (2013.01); *H04L 65/1063* (2013.01); *H04L 67/56* (2022.05); *H04L 63/0428* (2013.01)

(56) References Cited

U.S. PATENT DOCUMENTS

| | | | | |
|---|---|---|---|---|
| 8,111,630 | B2* | 2/2012 | Kovvali | H04L 67/2861 370/252 |
| 8,208,430 | B2* | 6/2012 | Valmikam | H04L 12/5602 370/328 |
| 8,316,237 | B1* | 11/2012 | Felsher | H04L 9/0825 713/171 |
| 9,380,456 | B1* | 6/2016 | Lee | H04L 67/2861 370/252 |
| 9,703,691 | B1* | 7/2017 | Yim | G06Q 30/0241 726/26 |
| 10,075,334 | B1* | 9/2018 | Kozura | H04W 12/086 |
| 2003/0110157 | A1* | 6/2003 | Maki | G06F 3/0637 |
| 2006/0072475 | A1* | 4/2006 | Ida | H04L 29/12254 370/252 |
| 2006/0195570 | A1* | 8/2006 | Zellner | H04L 63/0407 709/224 |
| 2007/0043928 | A1* | 2/2007 | Panesar | G06F 9/45558 711/206 |
| 2007/0053513 | A1* | 3/2007 | Hoffberg | G06K 9/00369 380/201 |
| 2008/0120330 | A1* | 5/2008 | Reed | G06F 16/40 |
| 2010/0146160 | A1* | 6/2010 | Piekarski | G06F 13/105 710/28 |
| 2010/0315997 | A1* | 12/2010 | Kim | H04N 21/43615 370/328 |
| 2011/0235595 | A1* | 9/2011 | Mehta | H04W 8/082 370/329 |
| 2011/0321167 | A1* | 12/2011 | Wu | G06Q 30/0241 726/26 |
| 2012/0076120 | A1* | 3/2012 | Kovvali | H04W 76/11 370/338 |
| 2012/0184258 | A1* | 7/2012 | Kovvali | H04W 4/18 455/418 |
| 2012/0226740 | A1* | 9/2012 | Nath | H04L 41/082 709/203 |
| 2013/0021933 | A1* | 1/2013 | Kovvali | H04W 88/18 370/252 |
| 2013/0060869 | A1* | 3/2013 | Davis | G06Q 50/01 709/206 |
| 2013/0067086 | A1* | 3/2013 | Hershko | H04L 61/157 709/225 |
| 2013/0086245 | A1* | 4/2013 | Lu | H04L 12/66 709/250 |
| 2013/0182572 | A1* | 7/2013 | Backholm | H04W 4/12 370/235 |
| 2014/0281500 | A1* | 9/2014 | Ignatchenko | G06F 21/53 713/156 |
| 2015/0106489 | A1* | 4/2015 | Duggirala | H04L 61/2521 709/222 |
| 2016/0080474 | A1* | 3/2016 | Argenti | G06F 9/5083 709/201 |
| 2016/0112375 | A1* | 4/2016 | Cohen | H04L 63/1425 726/12 |
| 2016/0112875 | A1* | 4/2016 | Kasravi | H04W 76/11 370/338 |
| 2016/0203320 | A1* | 7/2016 | Valceanu | H04L 12/5602 370/328 |
| 2016/0255167 | A1* | 9/2016 | Green | G06F 16/40 |
| 2016/0364553 | A1* | 12/2016 | Smith | H04L 63/0435 |
| 2017/0064045 | A1* | 3/2017 | Pai | H04L 63/0435 |
| 2017/0244637 | A1* | 8/2017 | Singhal | H04L 45/7453 |
| 2017/0257886 | A1* | 9/2017 | Adjakple | H04L 67/2814 |
| 2017/0272316 | A1* | 9/2017 | Johnson | H04L 29/12254 370/252 |
| 2017/0280324 | A1* | 9/2017 | Beals | H04L 63/0853 |
| 2018/0048729 | A1* | 2/2018 | Duvdevani | H04L 67/2814 |
| 2018/0062995 | A1* | 3/2018 | Naar | H04W 12/086 |
| 2019/0014611 | A1* | 1/2019 | Schenk | G06F 13/105 710/28 |

* cited by examiner

SYSTEMS AND METHODS FOR TRACKING DEVICE IDS FOR VIRTUALIZED APPLICATIONS

CROSS-REFERENCE TO RELATED APPLICATION(S)

This patent application claims the benefit under 35 U.S.C. § 119 to U.S. Provisional Patent Application No. 62/422,960, filed on Nov. 16, 2016, the entirety of which is incorporated herein by reference.

TECHNICAL FIELD

Various embodiments of the present disclosure relate generally to tracking message traffic over a computer network and, more particularly, to tracking device IDs for message traffic originating from virtualized applications.

BACKGROUND

Internet service providers, advertisers, application developers, and others often track the source of content requests, advertising views, application installations, etc. in order to properly attribute those actions to the originating device and device user. Such tracking is often based on a device ID of the originating device. However, when an application is run virtually within an emulator, the attributed device ID is the device ID of the emulator, not the actual originating device. The emulator device ID may be valid only during the lifetime of the emulator and, thus, may not be useful for tracking and analytics on network message traffic over time. This may result in lost revenue or inaccurate usage attribution relating to the actual originating device.

The present disclosure is directed to overcoming one or more of these above-referenced challenges.

SUMMARY OF THE DISCLOSURE

According to certain aspects of the disclosure, systems and methods are disclosed for tracking device IDs for virtualized applications.

In one embodiment, a computer-implemented method is disclosed for tracking device IDs for virtualized applications. The method includes: receiving, at a proxy server, a network message originating from an emulated application, inspecting the network message to determine if a device ID is set for the network message, obtaining an originating device ID corresponding to the device ID in the network message, replacing the device ID in the network message with the originating device ID, and transmitting the network message to a specified destination server.

In an alternative embodiment, a computer-implemented method is disclosed for tracking device IDs for virtualized applications. The method includes: intercepting, at a network message inspector, a network message originating from an emulated application, inspecting the network message to determine if a device ID is set for the network message, obtaining an originating device ID corresponding to the device ID in the network message, replacing the device ID in the network message with the originating device ID, and transmitting the network message to a specified destination server.

In an another embodiment, a computer-implemented method is disclosed for tracking device IDs for virtualized applications. The method includes: publishing an application programming interface (API) to specify a device ID to use in network messages, receiving a specified device ID via the published API, instantiating an emulated application using the specified device ID, generating a network message for the emulated application such that the generated network message includes the specified device ID, and transmitting the network message to a specified destination server.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
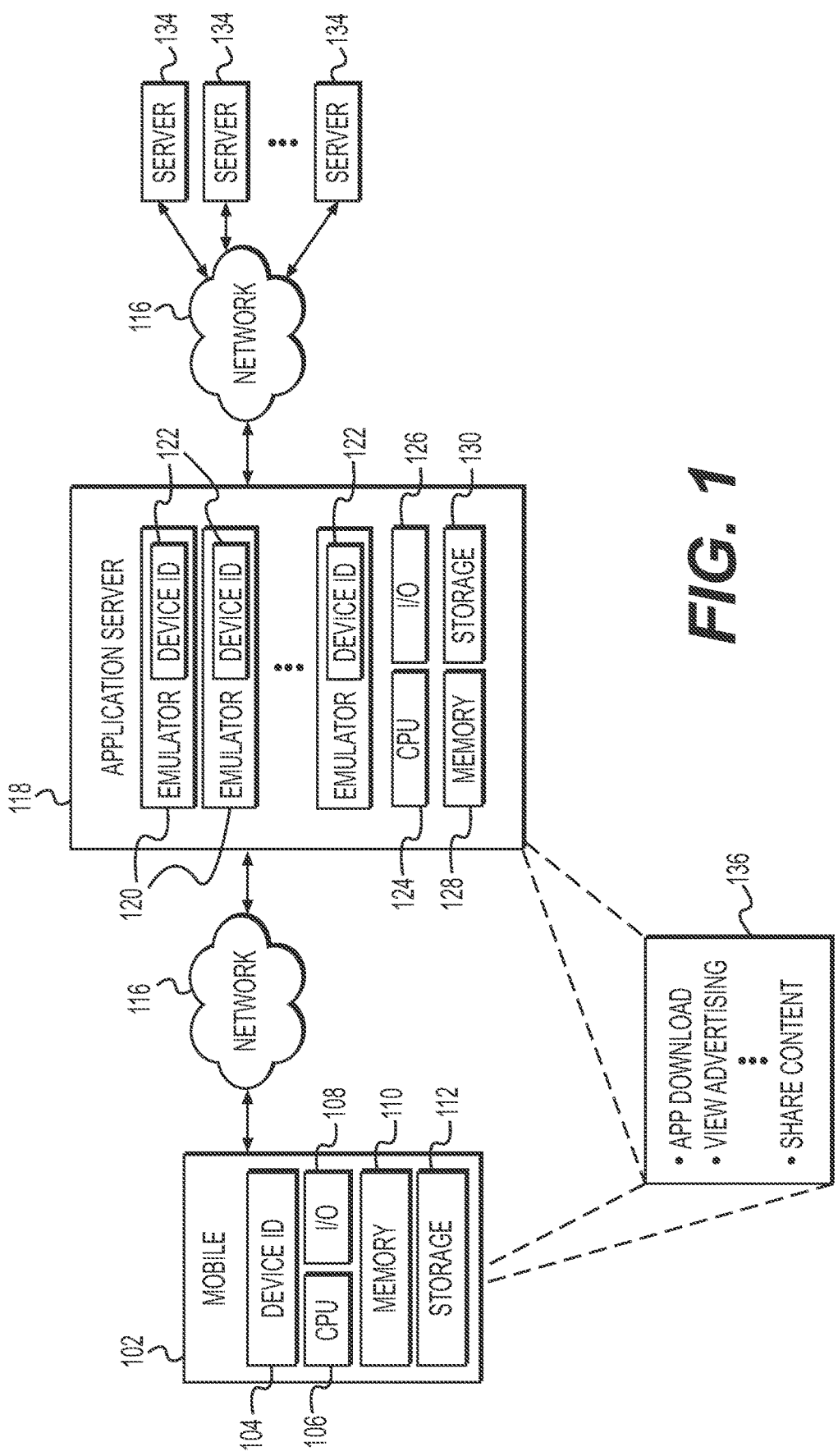
FIG. 1 depicts an exemplary system infrastructure for executing applications within virtualized environments, according to one or more embodiments.

Various embodiments of the present disclosure relate generally to enabling voice control of an interactive audio-visual environment, and monitoring user behavior to assess engagement.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to allow tracking device IDs for virtualized applications. FIGS. 1-7 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1-7. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As shown in FIG. 1, a mobile device 102 may include a central processing unit ("CPU") 106, in the form of one or more processors, for executing program instructions, a data communication interface 108 for communication over a wired or wireless computer network, a memory 110, and storage 112. Mobile device 102 may also include a device ID 104. Mobile device 102 may communicate with an application server 118 by way of data communication interface 108 and a computer network 116.

Application server 118 may also include a central processing unit ("CPU") 124, in the form of one or more processors, for executing program instructions, a data communication interface 126 for communication over a wired or wireless computer network, a memory 128, and storage 130. Application server 118 may control CPU 124 to execute program instructions which create instances of a virtualized application as one or more emulator 120. Each emulator 120 may include a device ID 122, which may be stored in memory 128 and/or storage 130. The valid lifetime of each device ID 122 may be limited to the lifetime of the respective emulator 120.

Mobile device 102, interacting with a virtualized application provided by emulator 120 running on application server 118, may generate one or more requests or messages 136 to be transmitted to an external server 134 by way of network 116. These requests or messages may include, for example, requests to download an application, view advertising or other content, share content with users of other devices, etc. Such requests transmitted by a virtualized application provided by emulator 120 may include device ID 122 associated with each emulator 120 instead of device ID 104 associated with the originating mobile device 102. Thus, such requests or messages transmitted by a virtualized application provided by emulator 120 may not be attributed to the originating mobile device 102.

In order to attribute requests or messages transmitted by a virtualized application to the originating device, the device ID associated with an emulator may be replaced with the device ID associated with the originating mobile device.

Figure 2:
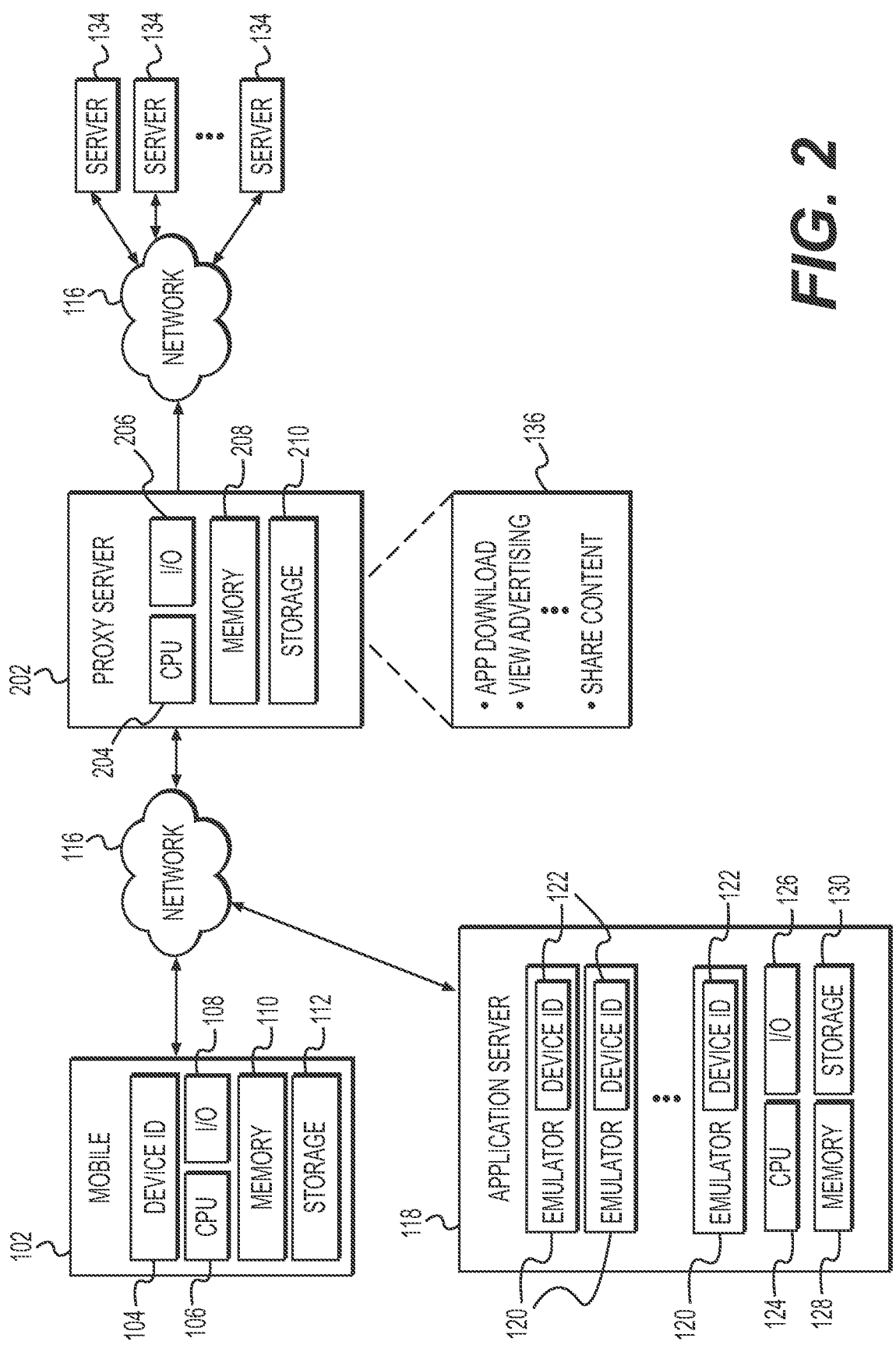
FIG. 2 depicts an exemplary system infrastructure for tracking device IDs for virtualized applications, according to one or more embodiments.

According to one or more embodiments, such as the exemplary system infrastructure for tracking device IDs for virtualized applications depicted in FIG. 2, a system may provide a proxy server, such as proxy server 202 depicted in FIG. 2. Proxy server 202 may also include a central processing unit ("CPU") 204, in the form of one or more processors, for executing program instructions, a data communication interface 206 for communication over a wired or wireless computer network, a memory 208, and storage 210. Proxy server 202 may communicate with application server 118 and mobile device 102 by way of computer network 116. For example, proxy server 202 may receive device ID 104 from originating mobile device 102. Device ID 104 from originating mobile device may be stored in a lookup table contained in storage 210 or in memory 208. Proxy server 202 may also receive requests or messages 136 from application server 118, each request or message possibly including device ID 122 associated with the emulator 120 generating the request or message. The proxy server may then execute a process for replacing the device ID 122 associated with the emulator 120 contained in request or message 136 with device ID 104 of originating mobile device 102, which may be obtained from the lookup table contained in storage 210 or in memory 208.

Figure 3:
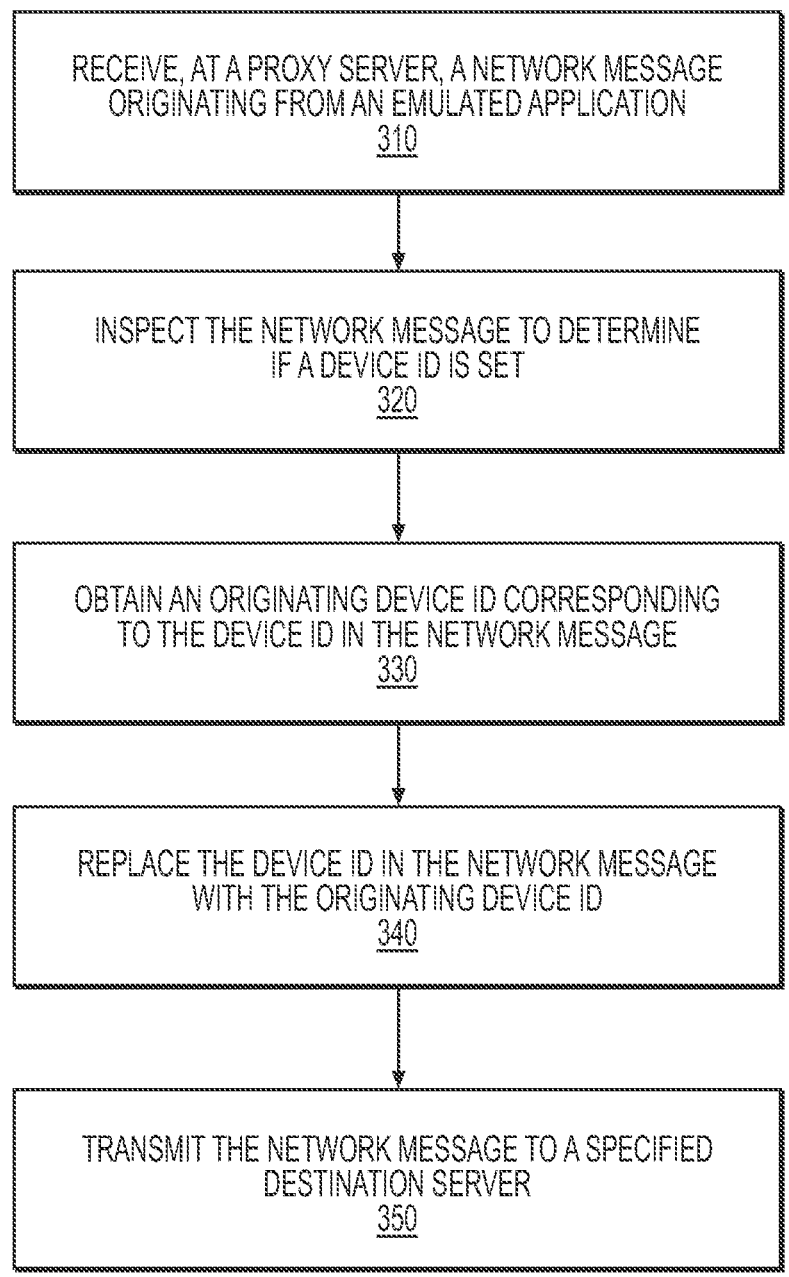
FIG. 3 depicts a flowchart of a method of tracking device IDs for virtualized applications, according to one or more embodiments.

FIG. 3 depicts a flowchart of a method of tracking device IDs for virtualized applications, according to one or more embodiments, such as may be performed by proxy server 202. As shown in FIG. 3, at step 310, a proxy server, such as proxy server 202 depicted in FIG. 2, may receive a network message originating from an emulated application, such as an application executed by emulator 120 running on application server 118. At step 320, the proxy server may inspect the network message to determine if a device ID is set. At step 330, the proxy server may obtain an originating device ID corresponding to the device ID in the network message. At step 340, the proxy server may replace the device ID in the network message with the originating device ID. At step 350, the proxy server may transmit the network message to a specified destination server.

Figure 4:
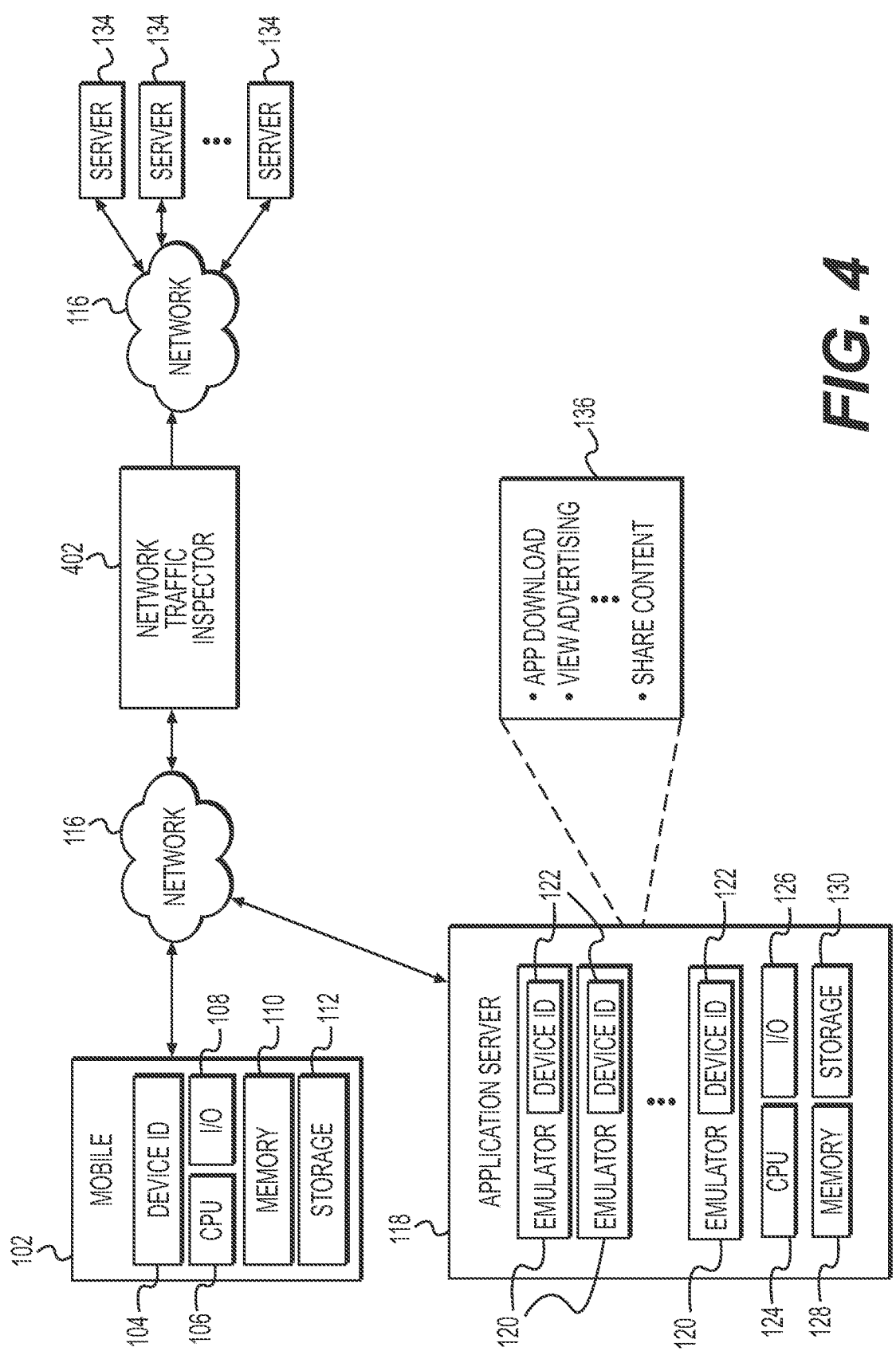
FIG. 4 depicts an exemplary system infrastructure for tracking device IDs for virtualized applications, according to one or more embodiments.

According to one or more embodiments, such as the exemplary system infrastructure for tracking device IDs for virtualized applications depicted in FIG. 4, a system may provide a network traffic inspector, such as network traffic inspector 402 depicted in FIG. 4.

According to one or more embodiments, the network traffic inspector may intercept and inspect requests or messages from application server 118, each request or message possibly including device ID 122 associated with the emulator 120 generating the request or message. The network traffic inspector may intercept and inspect requests or messages from certain vendors, which the network traffic inspector may identify according to URL. The requests or messages to be intercepted may be identified based on information obtained from vendors or other entities operating application servers, such as application server 118, which run application emulators generating requests or messages. If the intercepted request or message is unencrypted, the network traffic inspector may directly replace the emulator device ID with the originating device ID. If the intercepted request or message is encrypted, such as by HTTPS, for example, the network traffic inspector may implement a man-in-the-middle operation to make changes to the intercepted request or message. Alternatively, the network traffic inspector may generate a new encrypted replacement request or message to transmit in place of the original request or message. For some requests or messages, the network traffic inspector may also modify a device type specified in the request or message. For example, the network traffic inspector may change the device type from Android to iPhone.

Figure 5:
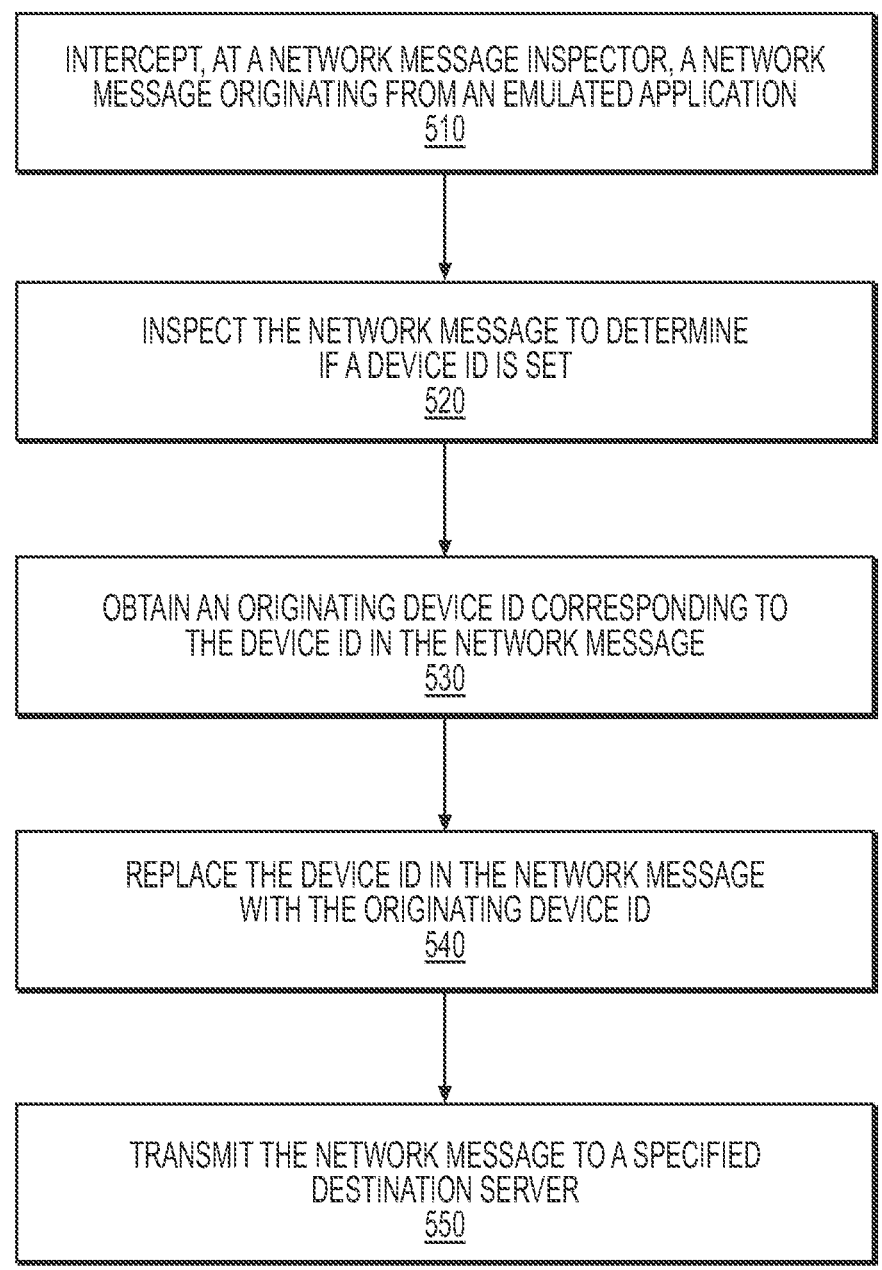
FIG. 5 depicts a flowchart of a method of tracking device IDs for virtualized applications, according to one or more embodiments.

FIG. 5 depicts a flowchart of a method of tracking device IDs for virtualized applications, according to one or more embodiments. As shown in FIG. 5, at operation 510, a network traffic inspector, such as network traffic inspector 402 depicted in FIG. 4, may intercept a network message originating from an emulated application. At operation 520, the network traffic inspector may inspect the network message to determine if a device ID is set. At operation 530, the network traffic inspector may obtain an originating device ID corresponding to the device ID in the network message. At operation 540, the network traffic inspector may replace the device ID in the network message with the originating device ID. At operation 550, the network traffic inspector may transmit the network message to a specified destination server.

Figure 6:
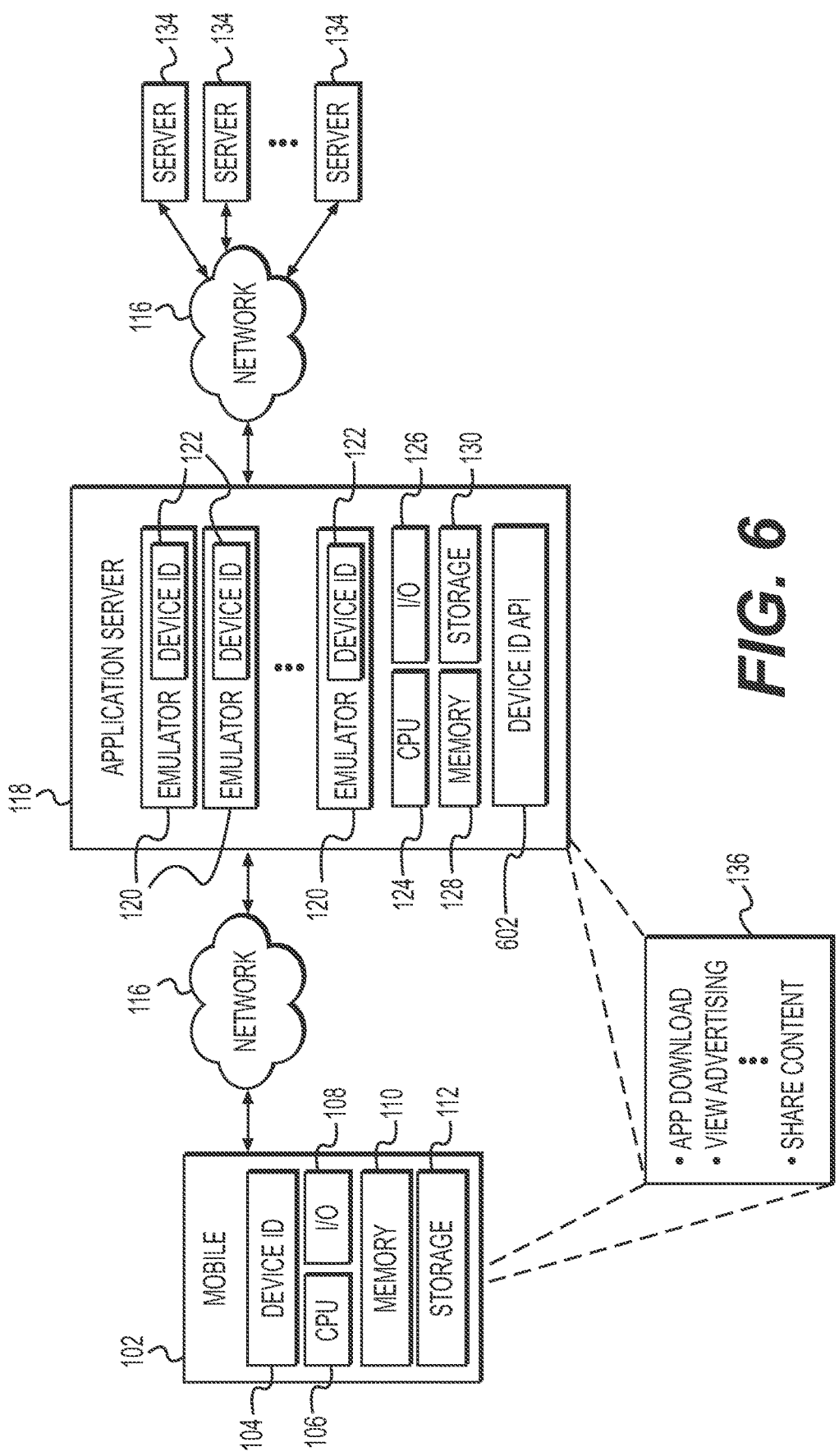
FIG. 6 depicts an exemplary system infrastructure for tracking device IDs for virtualized applications, according to one or more embodiments.

According to one or more embodiments, such as the exemplary system infrastructure for tracking device IDs for virtualized applications depicted in FIG. 6, an application server, such as application server 118 depicted in FIG. 6, may publish an application programming interface (API), such as device ID API 602 depicted in FIG. 6, for specifying an originating device ID. A mobile device, such as mobile device 102 depicted in FIG. 6, may access such an API to specify a device ID to be used when the application server initializes a new emulator, such as emulator 120 depicted in FIG. 6. Alternatively, a request from the mobile device to the application server to initialize a new virtualized application may contain a device ID to be used by the virtualized application. Such a request may obtain the specified device ID natively from the mobile device or may obtain the specified device ID from a database of device IDs associated with a mobile device user, geographic information, an IP address, etc. A newly initialized emulator may set the device ID for the emulator, such as device ID 122 depicted in FIG. 6, to the specified device ID. Network requests or messages generated by a virtualized application running within the emulator may contain the specified device ID.

Figure 7:
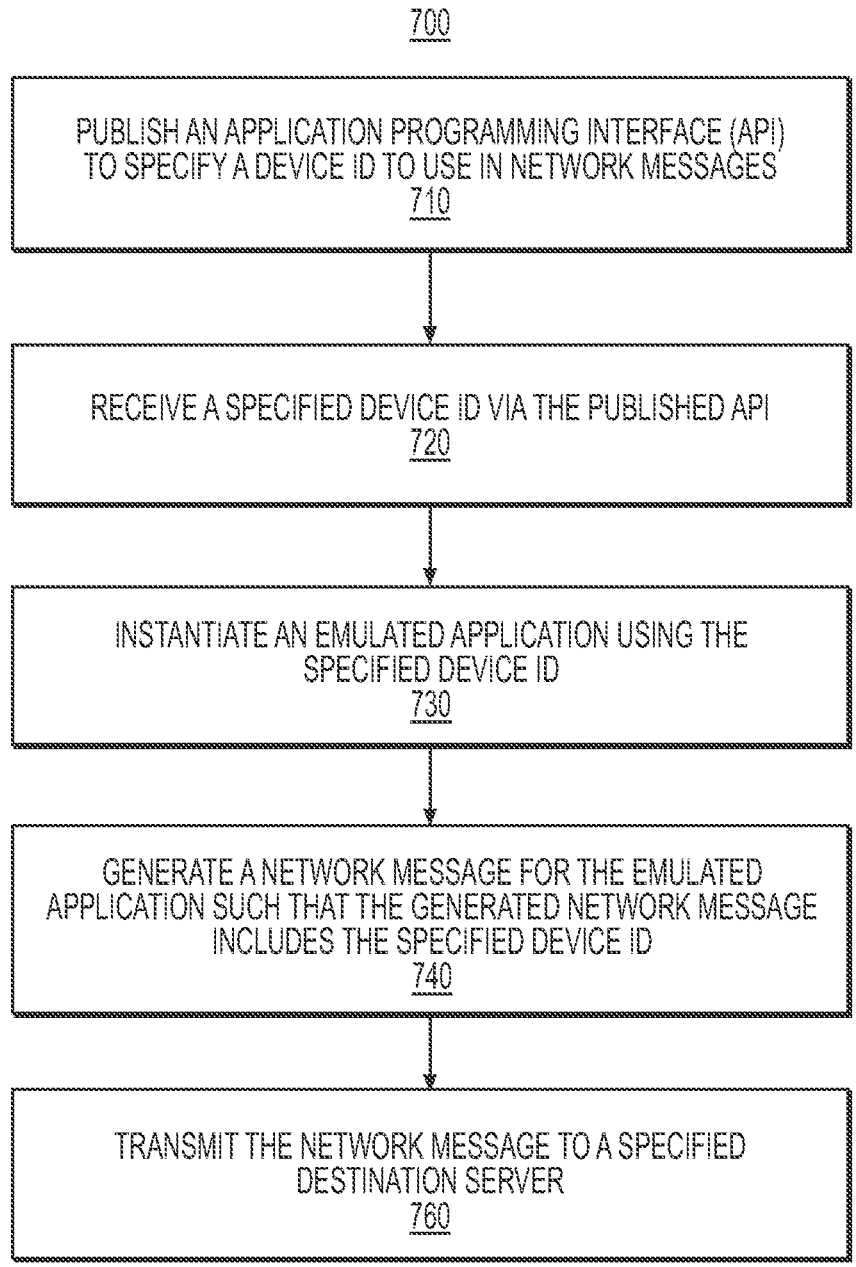
FIG. 7 depicts a flowchart of a method of tracking device IDs for virtualized applications, according to one or more embodiments.

FIG. 7 depicts a flowchart of a method of tracking device IDs for virtualized applications, according to one or more embodiments. As shown in FIG. 7, at operation 710, the application server may publish an application programming interface (API) to specify a device ID to use in network messages. At operation 720, the application server may receive a specified device ID via the published API. At operation 730, the application server may instantiate an emulated application using the specified device ID. At operation 740, the application server may generate a network message for the emulated application such that the generated network message includes the specified device ID. At operation 760, the application server may transmit the network message to a specified destination server.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of tracking device IDs for virtualized applications, comprising:
   receiving, at a proxy server, a network message originating from an emulated application running on an originating device;
   inspecting the network message to determine if a device ID of the emulated application is set for the network message;
   obtaining an originating device ID corresponding to the device ID of the emulated application in the network message, wherein the originating device is a mobile device;
   replacing, by a device other than the originating device, a device type of the emulated application specified in the network message with a device type of the originating device;
   replacing the device ID of the emulated application in the network message with the originating device ID; and
   transmitting the network message to a specified destination server.

2. The method of claim 1, wherein the network message is one of a request to view advertising, a request to view other content, and a request to share content with users of other devices.

3. The method of claim 1, wherein the originating device ID corresponding to the device ID of the emulated application is stored in a lookup table.

4. A method of tracking device IDs for virtualized applications, comprising:
   intercepting, at a network message inspector, a network message originating from an emulated application running on an originating device;
   inspecting the network message to determine if a device ID of the emulated application is set for the network message;
   obtaining an originating device ID corresponding to the device ID of the emulated application in the network message, wherein the originating device is a mobile device;

replacing, by a device other than the originating device, a device type of the emulated application specified in the network message with a device type of the originating device;

replacing the device ID of the emulated application in the network message with the originating device ID; and transmitting the network message to a specified destination server.

5. The method of claim 4, wherein the network message is one of a request to view advertising, a request to view other content, and a request to share content with users of other devices.

6. The method of claim 4, wherein the originating device ID corresponding to the device ID is stored in a lookup table.

7. The method of claim 4, wherein the network message is intercepted based on information obtained from an application server running the emulated application.

8. The method of claim 4, further comprising, when the network message is unencrypted:
   generating a replacement network message including the originating device ID; and
   transmitting the replacement network message to the specified destination server.

9. The method of claim 4, further comprising, when the network message is encrypted:
   implementing a man-in-the-middle operation to modify the intercepted network message; and
   transmitting the modified network message to the specified destination server.

10. The method of claim 9, wherein the replacement network message is encrypted.

11. The method of claim 9, wherein the replacement network message is unencrypted.

12. A non-transitory machine-readable medium storing instructions that, when executed by a computing system, causes the computing system to perform a method for tracking device IDs for virtualized applications, the method including:
    intercepting, at a network message inspector, a network message originating from an emulated application running on an originating device;
    inspecting the network message to determine if a device ID of the emulated application is set for the network message;
    obtaining an originating device ID corresponding to the device ID of the emulated application in the network message, wherein the originating device is a mobile device;
    replacing, by a device other than the originating device, a device type of the emulated application specified in the network message with a different device type, the different device type being a device type of the originating device;
    replacing the device ID of the emulated application in the network message with the originating device ID; and
    transmitting the network message to a specified destination server.

13. The non-transitory machine-readable medium of claim 12, wherein the network message is one of a request to view advertising, a request to view other content, and a request to share content with users of other devices.

14. The non-transitory machine-readable medium of claim 12, wherein the originating device ID corresponding to the device ID is stored in a lookup table.

15. The non-transitory machine-readable medium of claim 12, wherein the network message is intercepted based on information obtained from an application server running the emulated application.

16. The non-transitory machine-readable medium of claim 12, the method further comprising, when the network message is unencrypted:
    generating a replacement network message including the originating device ID; and
    transmitting the replacement network message to the specified destination server.

17. The non-transitory machine-readable medium of claim 12, the method further comprising, when the network message is encrypted:
    implementing a man-in-the-middle operation to modify the intercepted network message; and
    transmitting the modified network message to the specified destination server.

* * * * *